(12) United States Patent
Longardner

(10) Patent No.: US 6,400,896 B1
(45) Date of Patent: Jun. 4, 2002

(54) PHASE CHANGE MATERIAL HEAT EXCHANGER WITH HEAT ENERGY TRANSFER ELEMENTS EXTENDING THROUGH THE PHASE CHANGE MATERIAL

(75) Inventor: Robert L. Longardner, Indianapolis, IN (US)

(73) Assignee: Trexco, LLC, Indianapolis, IN (US)

( * ) Notice: Subject to any disclaimer, the term of this patent is extended or adjusted under 35 U.S.C. 154(b) by 0 days.

(21) Appl. No.: 09/607,853

(22) Filed: Jun. 30, 2000

Related U.S. Application Data
(60) Provisional application No. 60/142,095, filed on Jul. 2, 1999.

(51) Int. Cl.[7] .................................................. H05B 3/00
(52) U.S. Cl. ................... 392/341; 165/104.17; 126/400
(58) Field of Search .............................. 392/341, 480, 392/492, 346; 219/530, 540; 126/400, 263.01; 165/104.11, 104.17, 10

(56) References Cited

U.S. PATENT DOCUMENTS

| | | | | |
|---|---|---|---|---|
| 3,356,828 A | * | 12/1967 | Furness | 392/341 |
| 3,569,669 A | * | 3/1971 | March | 219/530 |
| 3,960,207 A | * | 6/1976 | Boer | 126/400 |
| 5,220,954 A | | 6/1993 | Longardner et al. | |

FOREIGN PATENT DOCUMENTS

| | | | | |
|---|---|---|---|---|
| CH | 223907 | * | 1/1943 | 392/341 |
| FR | 839978 | * | 4/1939 | 392/341 |
| GB | 1179265 | * | 1/1970 | 392/346 |
| JP | 6-281372 | * | 10/1994 | |

\* cited by examiner

*Primary Examiner*—John A. Jeffery
(74) *Attorney, Agent, or Firm*—Robert E. Browne; Gary R. Jarosik

(57) ABSTRACT

A heat exchanger for a phase change material including a container holding the phase change material, a tube surrounding the container to define an annular space therebetween, and preferably divider walls within that annular space to create a circuitous path for heat exchange fluid to be routed in multiple passes along the length of the container when passing from the top of the annular space to the bottom of the annular space. When the heat exchanger is operated in a melt cycle, multiple heat energy transfer elements positioned within the lower portion of the container and extending through the phase change material are heatable to a sufficiently high temperature to initiate melting of the phase change material. The heat energy transfer elements are preferably electrical resistance heated rods or coils, or tubes through which is routed high temperature fluid. When the heat exchanger is operated in a freeze cycle, heat exchange fluid at a low enough temperature to initiate freezing of the phase change material typically is introduced into the top of the annular space. In an alternate embodiment in which water is employed as a phase change material, the heat energy transfer elements are used in the freezing cycle, and heat exchange fluid flowing through the annular space is used in the melting cycle.

18 Claims, 6 Drawing Sheets

PHASE CHANGE MATERIAL HEAT EXCHANGER WITH HEAT ENERGY TRANSFER ELEMENTS EXTENDING THROUGH THE PHASE CHANGE MATERIAL

CROSS-REFERENCE TO RELATED APPLICATION

This application claims the benefit under 35 U.S.C. §119 (e) of U.S. Provisional Application No. 60/142,095, filed Jul. 2, 1999.

FIELD OF THE INVENTION

The present invention pertains to heat exchangers, and, in particular, to a heat exchanger incorporating an encapsulated phase change material to provide a heat storage.

BACKGROUND OF THE INVENTION

Heat exchangers with a variety of different constructions are known in the art, and are employed to accomplish various functions. One known heat exchanger, which is disclosed in U.S. Pat. No. 5,220,954, is a phase change material heat exchanger. In that design, a quantity of phase change material is encapsulated within a container encased within a tube. The annular space defined between the container and the tube is selectively sectioned such that heat exchanging fluid is routed in a specified, circuitous fashion through such space to obtain increased heat energy transfer between the passing fluid and the phase change material.

Heat exchangers of this type, if used properly, are especially advantageously employed in the task of making use of available energy. The current press for energy can most economically be met by using the untapped capacity of the existing electric generating plants, which untapped capacity essentially lies in the off-peak production capabilities of such plants. The transfer of off-peak produced energy through storage in heat exchangers to on-peak periods would provide improved shaping of the load profile for such plants. However, while useful, existing phase change material heat exchangers still have room for improvement both in the rate by which heat energy can be transferred to and from the phase change material, and the more efficient use of electricity to achieve a heat transfer to the phase change material.

Thus, it would be desirable to provide a heat exchanger which overcomes these and other shortcomings of the prior art.

SUMMARY OF THE INVENTION

The present invention provides a phase change material heat exchanger that has a space around the phase change material holding container divided into circuitous passageways for heat exchange fluid, and further includes a series of heat energy transfer elements, such as resistance heated rods, suspended within the interior volume of the container and embedded within the phase change material located therein. The heat energy transfer elements are suitable for directly introducing heat energy to achieve melting of solid phase change material, or, in certain circumstances, for withdrawing heat energy to promote the solidification or freezing of liquid phase change material within the heat exchanger container.

In one form thereof, the present invention provides a heat exchanger including a container, a phase change material within the container, a tube around the container and including an inlet and an outlet and defining with the container a flow path between the inlet and the outlet for a working fluid for transferring heat energy with the phase change material, and a plurality of means within the container for transferring heat energy with the phase change material.

In another form thereof, the present invention provides a heat exchanger including a container, a phase change material within the container, a tube around the container and including an inlet and an outlet and defining with the container a flow path between the inlet and the outlet for a working fluid for transferring heat energy with the phase change material, and at least one electrical resistance heated heat transfer element circuited with an electrical power source. The at least one heat transfer element is in contact with the phase change material within the container and is heatable to a sufficiently high temperature to initiate melting of the phase change material from its solid phase to its liquid phase.

In still other forms of the present invention, a heat exchanger for a phase change material having a solid density greater than its liquid density is provided having a container holding the phase change material, a tube surrounding the container to define an annular space therebetween, means for connecting the tube in fluid communication with a first source of heat exchange fluid to allow heat exchange fluid to flow through the annular space to exchange heat with the phase change material, and at least two divider walls extending between the tube and the container across the annular space to divide the annular space into at least an upper flow passageway and a second flow passageway, the upper flow passageway for receiving heat exchange fluid from the first source at a temperature sufficiently cool to initiate freezing of liquid phase change material in the container so that the phase change material is frozen from the top so that the newly-formed solid phase change material falls by gravity to a lower portion of the container to displace liquid phase change material to an upper portion of the container, the second flow passageway below the upper flow passageway for receiving heat exchange fluid from the upper flow passageway to flow in counterflow relationship with the heat exchange fluid flowing in the upper flow passageway. In one of such other forms of the present invention, the heat exchanger also includes at least one electrical resistance heated heat transfer element circuited with an electrical power source and positioned within the container to be in contact with the phase change material, and heatable to a sufficiently high temperature to initiate melting of the phase change material from its solid phase to its liquid phase. In a different one of such other forms of the present invention, the heat exchanger also includes a plurality of heat energy transfer elements positioned within the lower portion of the container and extending through the phase change material, the plurality of heat energy transfer elements each having an elongate shape and heatable to a sufficiently high temperature to initiate melting of the phase change material from its solid phase to its liquid phase so that the phase change material is melted from the bottom as it moves to the lower portion of the container to cause newly-formed liquid phase change material to be displaced to the upper portion of the container.

One advantage of the heat exchanger of the present invention is that it allows extra energy to be stored for subsequent use instead of merely dissipated and wasted.

Another advantage of the present invention is that it allows off-peak energy to be captured and diverted to on-peak uses.

Another advantage of the present invention is that it facilitates the process of liquefying phase change material in a heat exchanger with off-peak electrical energy.

Another advantage of the present invention is that the embedding of additional heat energy transfer elements within the phase change material achieves a direct contact with the phase change material that promotes an efficient heat transfer.

Still another advantage of the present invention is that heat energy transfer elements may be located within the phase change material to melt that material from the bottom, and the energy stored in the melted phase change material is released to a working fluid flowing circuitously in an annular space of the heat exchanger from the top of the heat exchanger to the bottom, whereby the releasing of energy to the working fluid results in a freezing of the phase change material that can be remelted by the heat energy transfer elements.

BRIEF DESCRIPTION OF THE DRAWINGS

The above mentioned and other advantages and objects of this invention, and the manner of attaining them, will become more apparent and the invention itself will be better understood by reference to the following description of embodiments of the invention taken in conjunction with the accompanying drawings, wherein.

Figure 1:
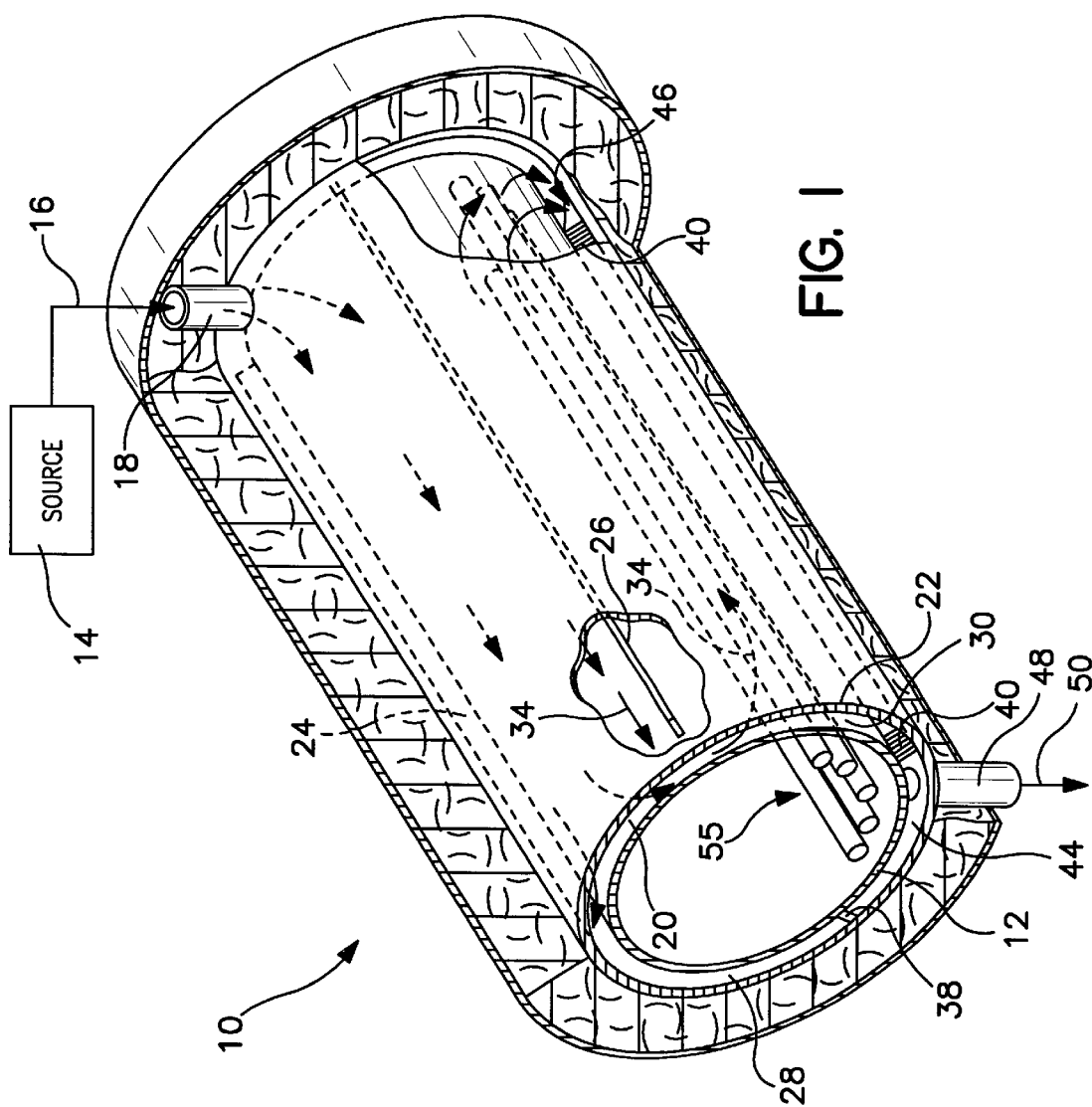
FIG. 1 is a diagrammatic perspective view of a phase change material heat exchanger equipped with heat energy transfer elements according to a first embodiment of the present invention.
Figure 3:
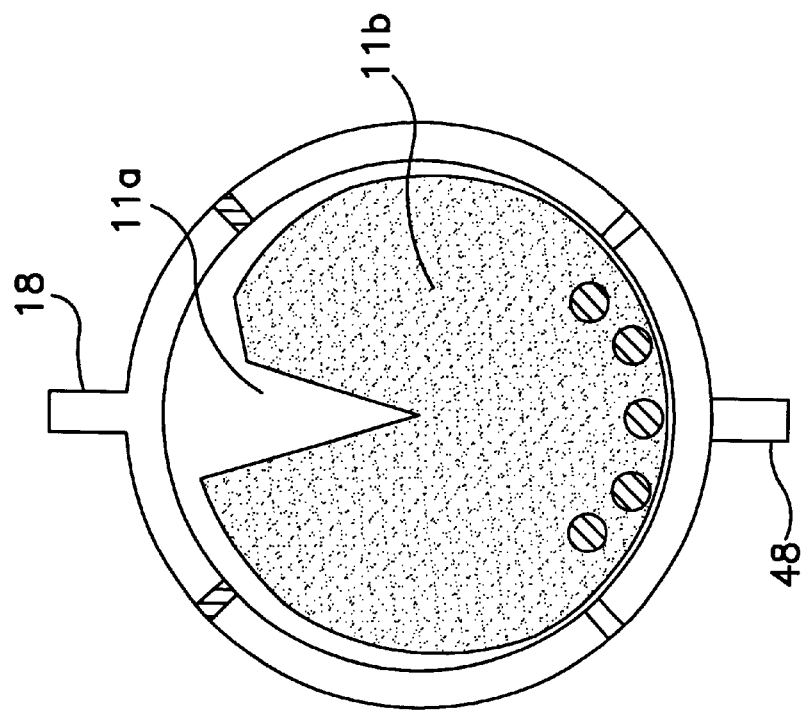
FIG. 3 is a cross-sectional end view of the phase change material heat exchanger of FIG. 2 at a later stage of the freezing cycle.

Corresponding reference characters indicate corresponding parts throughout the several views. Although the drawings represent embodiments of the invention, the drawings are not necessarily to scale and certain features may be exaggerated or omitted in order to better illustrate and explain the present invention.

DESCRIPTION OF THE PREFERRED EMBODIMENTS

The embodiments disclosed below are not intended to be exhaustive or limit the invention to the precise forms disclosed in the following detailed description. Rather, the embodiments are chosen and described so that others skilled in the art may better utilize the teachings of the invention.

Figure 2:
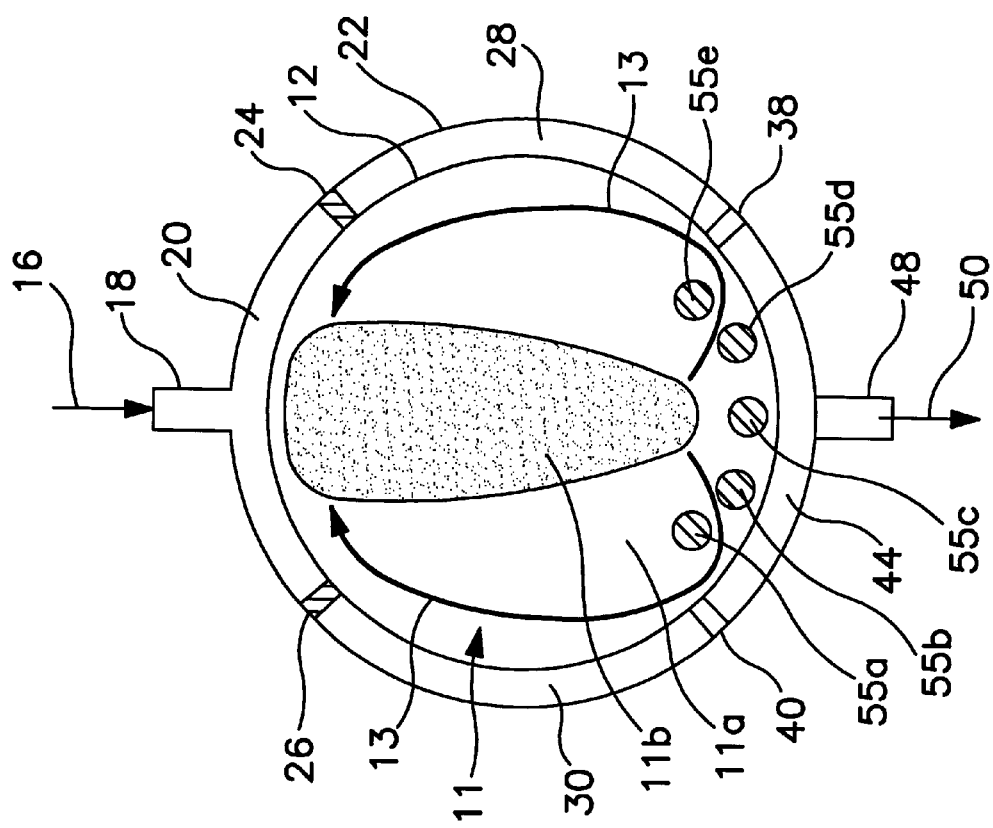
FIG. 2 is a cross-sectional end view of the phase change material heat exchanger of FIG. 1 during a freezing or cooling cycle in which heat energy is being withdrawn from the phase change material and being transferred to the working fluid flowing downward in the circuitous path defined within the annular space around the container for the phase change material.

Referring now to FIG. 1, there is diagrammatically shown a perspective view of a first embodiment of a phase change material heat exchanger of the present invention. Except for the supplemental heat energy transfer elements within the phase change material as further described below, the heat exchanger, generally designated 10, is of a general construction described in detail in U.S. Pat. No. 5,220,954 to Longardner et al., the disclosure of which is incorporated herein by reference in its entirety. The following description of the flow path for the working or heat exchange fluid in heat exchanger 10, given with reference primarily to FIGS. 1 and 2, is meant to be illustrative but not limiting, as any of the working fluid flow paths for the heat exchangers disclosed in U.S. Pat. No. 5,220,954 may be employed within the scope of the present invention.

Heat exchanger 10 is a three-pass heat exchanger in that three passes of the working fluid along the length of the container that holds the phase change material are provided. A heat exchanger having a fewer number of passes, such as two or even one, alternatively may be employed within the scope of the invention. Furthermore, a heat exchanger having a number of passes greater than three may also be employed.

Due to the presence of the inventive heat energy transfer elements, when the heat exchanger is storing heat in the phase change material, working fluid is typically only routed through the shown heat exchanger in a single direction, namely top-to-bottom (i.e., into the top port, multiple passes along and then down the side of the three-pass heat exchanger, and then ultimately out the bottom port), in order to cool liquified phase change material and thereby heat the working fluid. Working fluid is not typically routed bottom-to-top through the heat exchanger during melting of a solid phase change material, but can be so routed if, for example, it is desired to cool that working fluid or speed the melting process provided by the inventive heat energy transfer elements.

In particular, and as would be used in the process of solidifying or freezing within the container 12 the liquid or melted portion 11a of a phase change material (not shown in FIG. 1) that has a solid density greater than a liquid density, a heat exchange working fluid from source 14 passes via line 16 through port 18 to reach upper flow passageway 20 defined between container 12 and outer wall 22. In the shown embodiment, outer wall 22 is a cylindrical tube that with the cylindrical container 12 defines an annular space having circular outer and inner radial peripheries, but other shapes of these components may be employed. Outer wall 22 is shown encased in a thermally insulating material, but such material may be eliminated if the heat exchanger is buried in the ground and the ground were to serve as the insulating layer. The working fluid flows through passageway 20 along the entire length of container 12. As shown, walls 24, 26 defining upper flow passageway 20 terminate a predetermined distance from the end of container 12. This allows heat exchange fluid to exit upper flow passageway 20 and enter side flow passageways 28, 30 in the reverse direction of flow as shown by flow arrows 34. Walls 24, 26, as well as walls 38, 40, are formed by bars welded along their lengths to the outer surface of container 12, but with such bars not directly attached to the outer wall 22. This design allows for a proper assembly of the heat exchanger annulus.

Walls 38, 40 defining side flow passageways 28, 30 likewise do not extend the full length of container 12, but rather terminate a predetermined distance from the other end of container 12 so that the working fluid exiting side flow passageways 28, 30 can enter lower flow passageway 44 in the reverse direction of flow as shown by flow arrows 46. The heat exchange working fluid flows through lower flow passageway 44 and exits through port 48 as shown by the flow arrow 50.

As the working fluid flows in the above described fashion and withdraws heat energy from the phase change material during the freezing cycle, the liquid phase change material 11a nearer the top of container 12 freezes to a solid state 11b and settles under gravity toward the bottom of the container, and in so settling displaces more liquid phase change material which is forced upward, such as along the paths indicated at 13, to in turn be frozen by the working fluid.

Figure 5:
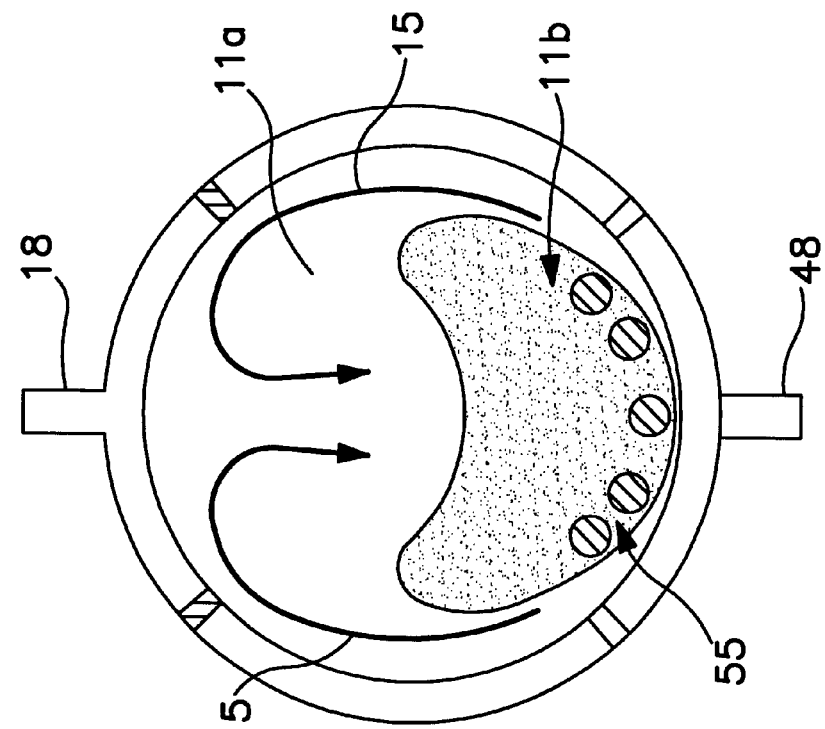
FIG. 5 is a cross-sectional end view of the phase change material heat exchanger of FIG. 4 at a later stage of the melting process illustrating the remaining solid portion of the phase change material dropping to the lower region of the heat exchanger as additional material is melted or liquified.
Figure 4:
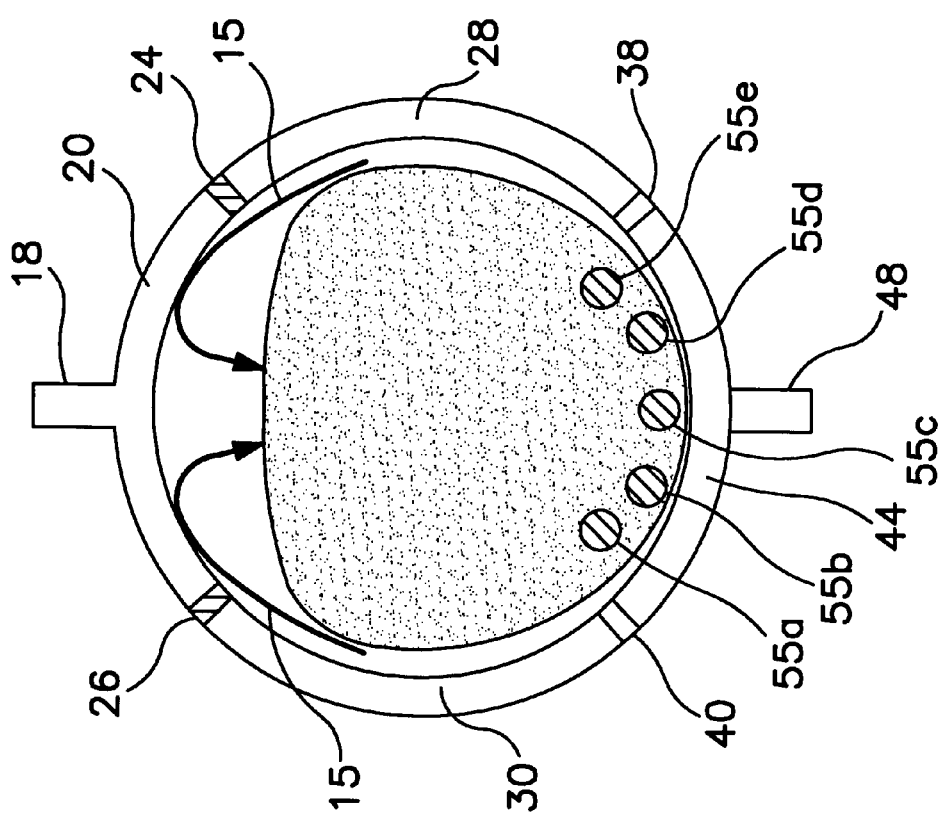
FIGS. 4 is a cross-sectional end view of the phase change material heat exchanger of FIG. 1 during a melting or heating cycle in which heat energy is being applied to a lower portion of the solid phase change material via the embedded heat energy transfer elements.
Figure 6:
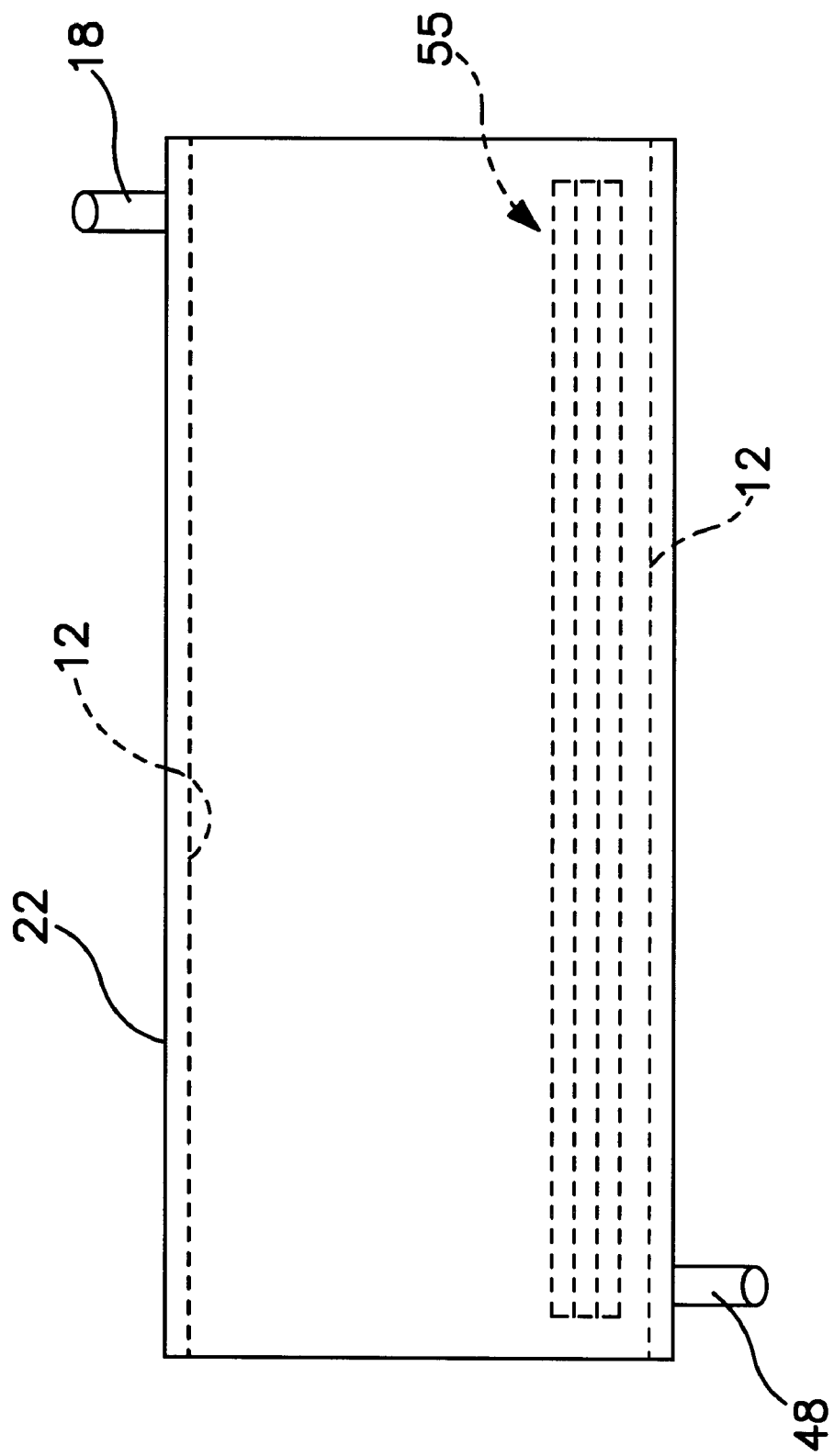
FIG. 6 is a side elevational view of select portions of the phase change material heat exchanger of FIG. 1.

Installed within the lower region of the interior volume of container 12 are a plurality of heat energy transfer elements, generally designated 55, that typically are used to introduce heat energy to the phase change material during the melting cycle in order to produce a change in temperature and/or state of that salt material. Although different salt materials as well as organic phase change materials may be employed, Magnesium Chloride Hexahydrate is preferably used in higher temperature applications and Calcium Chloride Hexahydrate is preferably used in lower temperature applications. Heat energy transfer elements 55 are shown in FIGS. 1 and 6 as running essentially the entire length of container 12, and are shown in FIGS. 2–5 as comprising a round shape in transverse cross-section. This shown length and shape is merely illustrative, as other lengths and shapes that provide contact area with the phase change material sufficient to produce adequate heat energy transfer capabilities may be substituted within the scope of the invention.

Heat energy transfer elements 55 include five individual elements 55a, 55b, 55c, 55d and 55e arranged in a curved, concave upward, pattern within a vertical cross-section taken perpendicularly to the heat exchanger length as shown in FIGS. 2–5. The preferred curvature of the elements 55 is parabolic. Each of the individual elements 55a, 55b, 55c, 55d and 55e is in spaced-apart relationship with the other of those individual elements as well as the bottom inner surface of container 12. As a result, along all of their respective lengths except at not shown points where such elements are mounted to the container, each heat energy transfer element 55a–e is surrounded by, and embedded within, the phase change material. This embedding achieves a heat energy transferring interface with the phase change material around the entire periphery of the elements, and further achieves an ability to melt the mass of solid phase change material therearound from within. Due to the parabolic arrangement of elements 55, the most lateral heat transfer elements 55a and 55e are in farther spaced-apart relationship with the container inner surface than heat transfer elements 55b and 55d, which in turn are in farther spaced-apart relationship with the container inner surface than heat transfer element 55c. This parabolic arrangement is conducive to phase change material that has been melted from a solid state to a liquid state by the heat energy transfer elements 55 being able to pass upward along the curved interior of container 12 under the remaining still solid phase change material as shown by arrows 15 in FIGS. 4 and 5.

The shown number and arrangement of heat energy transfer elements 55 is presently preferred, but other numbers, either less or more, and configurations may be employed within the scope of the invention. The number of heat energy transfer elements 55 is typically an odd number for symmetry about a central heat energy transfer element positioned closest to the container bottom. The number and arrangement may be varied dependent on the sizes of the container and/or the heat energy transfer elements. For example, and although it is believed that typically the effective rate of heat transfer is reduced, a single heat energy transfer element may be substituted for the five shown. For example, more elements than the five tubes shown may be used. Alternatively, the heat energy transfer elements could be arranged in a row, either vertically or horizontally oriented, or in a row and column format. Still further, while it is preferable that the elements be positioned in the bottom region of the container 12, as at this location the remaining solid or still frozen phase change material 11b tends to settle due to gravity as shown in FIG. 5 during the melting process, the heat energy transfer elements could be positioned at a higher elevation than shown, or for that matter could be in direct contact with the interior bottom surface of container 12. The heat exchanger should be arranged in a plumbed orientation to prevent uneven melting and freezing of the phase change material.

Heat energy transfer elements 55 may be constructed in one or more designs that introduce heat energy to the phase change material, generally designated 11. A preferred construction is in the form of a metal, cylindrical rod which via electrical resistance heating can be heated to a temperature higher than that temperature at which phase change material 11 melts from a solid state 11b to a liquid state 11a. For such a construction, the electrical connections to an external power source, such as a power generation station during off-peak hours, required to heat the elements 55 are not shown in the Figures, but could be extended through either or both of the ends of container 12, or through the cylindrical wall of container 12. Other heat energy transfer elements constructions, such as coils rather than the cylindrical solid rods shown, alternatively may be used.

In another alternate construction, heat energy transfer elements 55 are provided as hollow tubes through which a heat exchange working fluid of high temperature may be routed. If the working fluid is to be water, the tubes are designed to withstand the pressurization necessary to avoid the water flashing into steam during use. The plumbing of heat energy transfer elements 55 to a source of high temperature working fluid, as well as the return to that source, is not shown and may be provided in any manner known to those of skill in the art. For example, such hollow tubes may extend the entire container length and port through openings in the opposite ends of container 12 into a volume defined between the container ends and bell caps attached thereto, which bell caps, dependent on the flow path through the tubes, are either plumbed to an output line or a return line of a high temperature fluid source. The use of tubular, working fluid-conveying heat energy transfer elements 55 also allows additional cooling capabilities to be provided thereby to phase change material 11 during the freezing cycles illustrated in FIGS. 2 and 3. Specifically, with a source of suitably cool working fluid, the working fluid may be routed through tubes 55 to pre-cool the liquid phase change material encapsulated within container 12 that is intended to be frozen by the downward passage of working fluid through the annular space between outer wall 22 and container 12 as described above.

Figure 7:
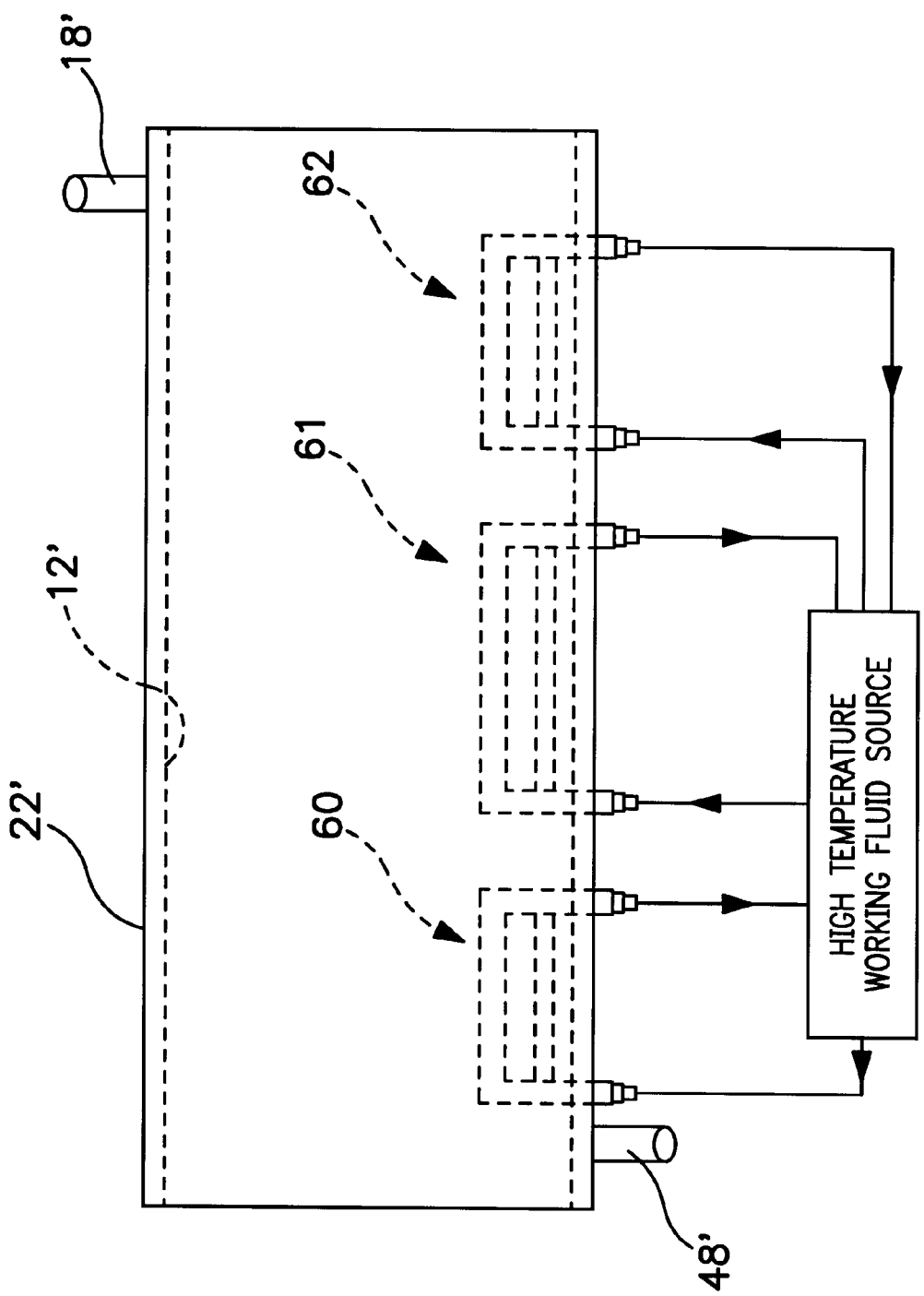
FIG. 7 is a diagrammatic side elevational view of another phase change material heat exchanger of the present invention with alternately configured heat energy transfer elements by which the phase change material is melted using a high temperature working fluid flowing through the transfer elements in the indicated directions.

Although heat energy transfer elements 55 preferably extend along all or substantially all of the entire length of container 12 to achieve a heat transfer to the phase change material 11 along that length, shorter heat energy transfer elements may be used. Furthermore, and as diagrammatically shown in the alternate embodiment of FIG. 7, different heat energy transfer elements could extend different axial segments of the full length of container 12'. For example, FIG. 7 illustrates an alternate embodiment in which sets of five heat energy transfer elements indicated at 60, 61 and 62 are provided at different portions of the container length, and each set of elements is separately routed to a source of high temperature working fluid such that greater amounts of the phase change material within container 12' may possibly be subjected to the higher temperature working fluid.

Figure 8:
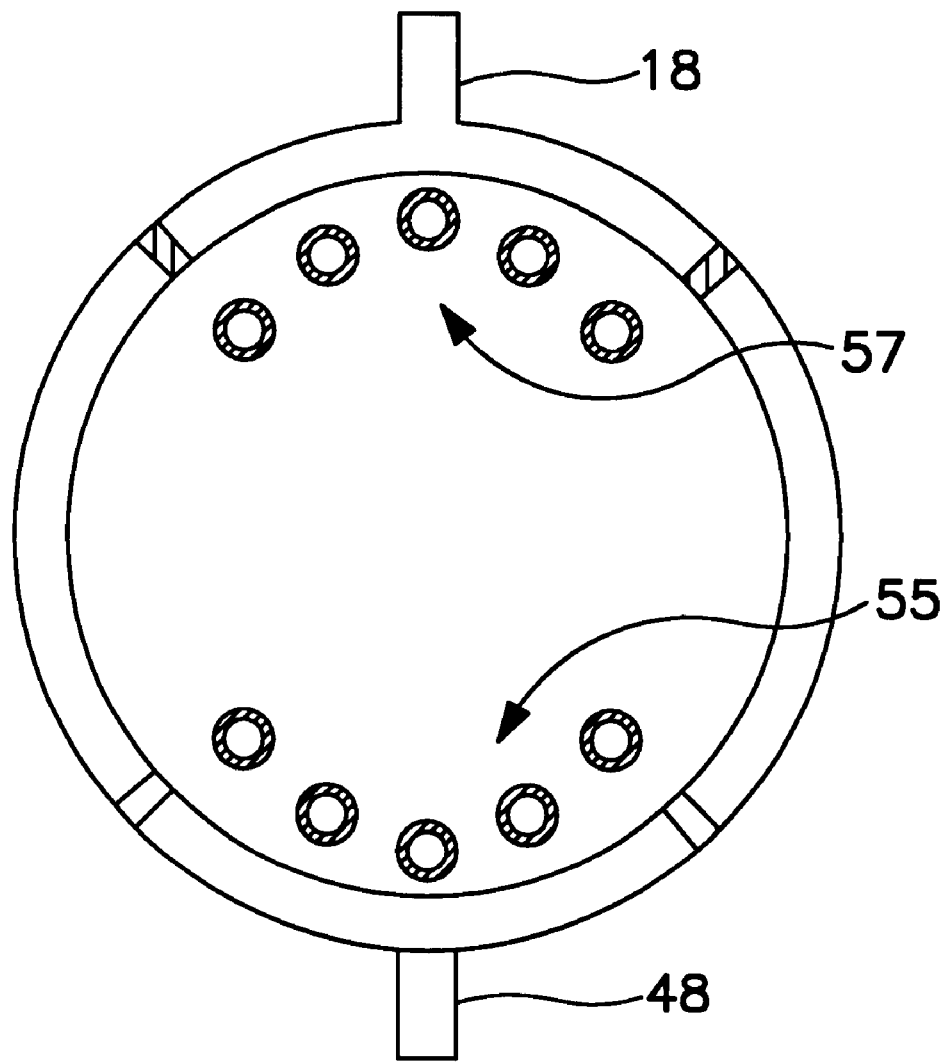
FIG. 8 is a diagrammatic cross-sectional end view of still another phase change material heat exchanger of the present invention with alternately configured heat energy transfer elements.

In still another alternate embodiment shown in FIG. 8, the heat energy transfer elements of the present invention are shown as including lower region elements 55 identical to those in the embodiment of FIGS. 1–5, as well as upper region heat energy transfer elements generally designated 57. In this embodiment, heat energy transfer elements 57 are tubes connected to a supply of low temperature working fluid, and are utilized to aid in cooling the liquid phase change material (not shown) to a frozen or solid state during the freezing cycle, while the heat energy transfer elements 55 are tubes positioned in the lower region of container 12 and are used (at different times than elements 57) with high temperature working fluid, or otherwise heated with an alternate heat source such as electricity, in order to heat and melt the phase change material during the melting cycle. Elements 57 typically would be used in conjunction with cool working fluid that is routed downward through the annular space around the phase change material container. This design with two sets of heat energy transfer elements, each intended to work during different cycles, is in recognition of the fact that the phase change salt has a higher density when in a solid state than when in a liquid state, and the phase change salt material to be melted is more likely to be present at the bottom region of the container, while the phase change salt material to be frozen is more likely to be encountered at the upper region of the container. It is within the scope of the invention to plumb or wire both sets of heat energy transfer elements 55, 57 such that each provides lower temperatures in the phase change material freezing cycle and higher temperature in the phase change material melting cycle.

The heat exchangers described herein have numerous beneficial applications. For example, the heat exchangers may be used in the following situations:

POWER GENERATION: Waste or produced heat from power generating equipment can be stored in the salt or phase change material of the heat exchangers and used to offset peak load requirements, increase base load capacity of generating equipment, and increase efficiency of generating systems while reducing potential for acid rain.

DISTRICT HEATING: By base loading steam or hot water from district heating systems, heat can be stored in the heat exchangers during off-peak hours, and circulating system water through the salt storage during peak heating hours extracts the heat previously stored for system or individual use.

ABSORPTION CHILLING: Heat either produced during off-peak hours or recovered from other work can be stored in the heat exchangers and provide a supply source for absorption refrigeration equipment. The ability to produce chilling effect from heat is a tremendous benefit as is the avoidance of the CFC issue, since absorption chilling utilizes no chlorofluorocarbons.

COGENERATION: In base loading a generator set and extracting exhaust heat in an air-to-water heat exchanger, heat can be stored in the heat exchangers during off-peak hours. The subsequent recovery of this heat during on-peak hours can be used for space conditioning to heat or cool or any other process requiring tempered air.

COMBUSTION AIR AND FUEL PREHEAT: By capturing waste process heat in an air-to-water heat exchanger and storing it the heat exchangers, heat can be extracted on demand to preheat/treat equipment inlet air and fuels as needed.

ORGANIC GAS TURBINES: Produced or captured waste process heat can be stored in the heat exchangers to power a Rankine turbine generator producing Kwh upon demand.

LABORATORIES, FOOD INDUSTRY AND HOSPITAL SERVICES: Waste heat from steam plants and other processes can be stored in the heat exchangers and extracted for countless applications in labs, hospitals and food processing plants.

ROADWAY MELTING SYSTEMS: Solar, rejected or energy purchased during off-peak hours can be stored in the heat exchanger and used in a hydronic heating system to melt snow and ice on pavement, such as on roadways and bridges, upon demand.

TRANSFORMER COOLING SYSTEMS: Off-peak energy from a transformer station can be stored in the heat exchanger and used in the process of cooling, and thereby possibly extending the working life of, that transformer station during peak hours, typically in the heat of the day, when ambient conditions are such that the station might otherwise overheat.

In still another embodiment, the heat exchanger of the present invention may be designed for storing cold as opposed to heat as described above. In such an alternate embodiment, water may be used as the phase change material, and the overall structure of the heat exchanger is as shown in FIGS. 1–5, but with the heat energy transfer elements 55 being tubes in flow communication with a source of low temperature working fluid, such as brine at a temperature that can freeze the water from the bottom up. When water is the phase change material, a surfactant can be blended into the water to break down the surface tension in the water. Due to the expansion properties of water while freezing, the water as phase change material would be provided to fill approximately 90% of the internal volume of container 12. As ice has a lesser density than water, the ice will rise and it will expand to fill the container when fully frozen. In operation of this alternate embodiment, during the freezing cycle, the brine or other low-temperature working fluid will be routed from a source through the tubular heat energy transfer elements 55 to initiate freezing of the liquid phase change material to create ice within container 12. The ice, which is created from the bottom up, will rise to the upper portion of the container 12 and thereby displace downward water in the liquid state, putting such liquid into heat exchanging contact with the embedded elements 55 until the entire volume of phase change material is frozen. When the phase change material is so frozen, during the melting cycle, a source of working fluid, such as at 14, desired to be cooled may be routed through the annulus surrounding container 12, such as in the three-pass pathway described above with reference to FIGS. 1–5, thereby releasing the latent stored cold of the ice, and in so doing melting the ice to water, which water in turn, at a subsequent freezing cycle, may be frozen by operation of, for example, brine conveying heat transfer elements 55.

While this invention has been shown and described as having preferred designs, the present invention may be further modified within the spirit and scope of this disclosure. For example, heat exchangers with still other working fluid flow paths may find beneficial application of the heat energy transfer elements of the present invention. The three-pass flow path described above may be modified into a two-pass heat exchanger by not using the bottom passageway 44 and providing suitable openings at the ends of flow passageways 28 and 30 through which fluid may be ported. This modification is in recognition of the fact that in heat exchangers in which the inventive heat energy transfer elements are lacking, the bottom flow passageway would be of primary usefulness or efficiency in the phase change salt melting process, but with the inventive heat energy transfer elements 55 the melting process has less need for heat transfer to working fluid in the space below the phase change material container for effective use. Still further, a heat exchanger with a simple fluid flow path extending in one direction in a straight line between ends of the container may also employ the heat transfer elements of the present invention. This application is therefore intended to cover any variations, uses, or adaptations of the invention using its general principles. Further, this application is intended to cover such departures from the present disclosure as come within known or customary practice in the art to which this invention pertains.

What is claimed is:

1. A heat exchanger comprising:
    a container;
    a phase change material within said container;
    a tube around said container and including an inlet and an outlet, said tube defining with said container a flow path between said inlet and said outlet for a working fluid for transferring heat energy with said phase change material; and
    a plurality of means within said container for transferring heat energy with said phase change material;
    wherein substantially the entirety of said plurality of heat energy transferring means are positioned in a bottom half of said container.

2. A heat exchanger comprising:
    a container;
    a phase change material within said container;
    a tube around said container and including an inlet and an outlet, said tube defining with said container a flow path between said inlet and said outlet for a working fluid for transferring heat energy with said phase change material;
    a plurality of means within said container for transferring heat energy with said phase change material; and
    wherein said plurality of heat energy transferring means comprise at least three heat energy transfer elements each having a length extending in a first direction within said container, and wherein within a plane through said container perpendicular to said first direction said at least three heat energy transfer elements are arranged in an arcuate pattern.

3. The heat exchanger of claim 2 wherein said at least three heat energy transfer elements comprises five electrical resistance heated members.

4. The heat exchanger of claim 2 wherein said curved pattern opens upwardly and is parabolic.

5. The heat exchanger of claim 2 wherein said container is circular in vertical cross-section, whereby a bottom interior surface of said container is curved, and wherein said curved pattern is parabolic.

6. The heat exchanger of claim 2 wherein said at least three heat energy transfer elements are positioned in a bottom half of said container and comprise in sequence along the curved pattern a first element, a second element, a third element, a fourth element and a fifth element, and wherein said third element is positioned closer to a bottom interior surface of said container than is said first element and said fifth element.

7. The heat exchanger of claim 6 wherein said container is circular in vertical cross-section, whereby said bottom interior surface of said container is curved, and wherein said first element and said fifth element are equal distant from said curved bottom interior surface of said container.

8. The heat exchanger of claim 1 wherein said plurality of heat energy transferring means comprises electrical resistance heated members that are heatable to a sufficiently high temperature to initiate melting of said phase change material from its solid phase to its liquid phase.

9. A heat exchanger comprising:
    a container;
    a phase change material within said container;
    a tube around said container and including an inlet and an outlet, said tube defining with said container a flow path between said inlet and said outlet for a working fluid for transferring heat energy with said phase change material; and
    a plurality of means within said container for transferring heat energy with said phase change material;
    wherein said plurality of heat energy transferring means are positioned in a bottom half of said container and comprise at least three heat energy transfer elements, wherein at least a portion of each of said at least three heat energy transfer elements is spaced above a bottom interior surface of said container and embedded within said phase change material.

10. The heat exchanger of claim 9 wherein said at least a portion of each of said at least three heat energy transfer elements extends along at least substantially all of a length of said container.

11. A heat exchanger comprising:
    a container;
    a phase change material within said container;
    a tube around said container and including an inlet and an outlet, said tube defining with said container a flow path between said inlet and said outlet for a working fluid for transferring heat energy with said phase change material; and
    at least one electrical resistance heated heat transfer element circuited with an electrical power source, said at least one electrical resistance heated heat transfer element in contact with said phase change material within said container and heatable to a sufficiently high temperature to initiate melting of said phase change material from its solid phase to its liquid phase;
    wherein said at least one electrical resistance heated heat transfer element comprises a first element a second element, and a third element each positioned in a bottom half of said container and having an elongate shape aligned with a length of said container, and wherein at least a portion of each of said first element, said second element, and said third element is spaced above a bottom interior surface of said container and embedded within said phase change material.

12. A heat exchanger comprising:

a container;

a phase change material within said container;

a tube around said container and including an inlet and an outlet, said tube defining with said container a flow path between said inlet and said outlet for a working fluid for transferring heat energy with said phase change material; and at least one electrical resistance heated heat transfer element circuited with an electrical power source, said at least one electrical resistance heated heat transfer element in contact with said phase change material within said container and heatable to a sufficiently high temperature to initiate melting of said phase change material from its solid phase to its liquid phase;

wherein said at least one electrical resistance heated heat transfer element comprises a first element, a second element, and a third element each positioned in a bottom half of said container and having an elongate shape aligned with a length of said container, and wherein at least a portion of each of said first element, said second element, and said third element is spaced above a bottom interior surface of said container and embedded within said phase change material; and wherein said second element is disposed between said first element and said third element along at least a segment of said container length, and wherein said second element between said first element and said third element is closer to said bottom interior surface of said container than is said first element and said third element.

13. A heat exchanger for a phase change material having a solid density greater than its liquid density, the heat exchanger comprising:

a container holding the phase change material;

a tube surrounding said container to define an annular space therebetween;

means for connecting said tube in fluid communication with a first source of heat exchange fluid to allow heat exchange fluid to flow through said annular space to exchange heat with the phase change material;

at least two divider walls extending between said tube and said container across said annular space to divide said annular space into at least an upper flow passageway and a second flow passageway, said upper flow passageway for receiving heat exchange fluid from said first source at a temperature sufficiently cool to initiate freezing of liquid phase change material in said container so that the phase change material is frozen from the top so that the newly-formed solid phase change material falls by gravity to a lower portion of said container to displace liquid phase change material to an upper portion of said container, said second flow passageway below said upper flow passageway for receiving heat exchange fluid from said upper flow passageway to flow in counterflow relationship with the heat exchange fluid flowing in said upper flow passageway; and at least one electrical resistance heated heat transfer element circuited with an electrical power source, said at least one electrical resistance heated heat transfer element positioned within said container to be in contact with the phase change material and heatable to a sufficiently high temperature to initiate melting of said phase change material from its solid phase to its liquid phase.

14. The heat exchanger of claim 13 wherein said at least one electrical resistance heated heat transfer element is positioned in the lower portion of said container, wherein at least a portion of said at least one electrical resistance heated heat transfer element is in spaced relationship with an interior surface of said container, whereby said at least a portion of said at least one electrical resistance heated heat transfer element is embedded within the phase change material within said container.

15. The heat exchanger of claim 14 wherein said at least one electrical resistance heated heat transfer element comprises a plurality of elements each spaced in a first direction from the other and extending transverse to the first direction along at least substantially all of a length of said container.

16. A heat exchanger for a phase change material having a solid density greater than its liquid density, the heat exchanger comprising:

a container holding the phase change material;

a tube surrounding said container to define an annular space therebetween;

means for connecting said tube in fluid communication with a first source of heat exchange fluid to allow heat exchange fluid to flow through said annular space to exchange heat with the phase change material;

at least two divider walls extending between said tube and said container across said annular space to divide said annular space into at least an upper flow passageway and a second flow passageway, said upper flow passageway for receiving heat exchange fluid from said first source at a temperature sufficiently cool to initiate freezing of liquid phase change material in said container so that the phase change material is frozen from the top so that the newly-formed solid phase change material falls by gravity to a lower portion of said container to displace liquid phase change material to an upper portion of said container, said second flow passageway below said upper flow passageway for receiving heat exchange fluid from said upper flow passageway to flow in counterflow relationship with the heat exchange fluid flowing in said upper flow passageway; and a plurality of heat energy transfer elements positioned within the lower portion of said container and extending through the phase change material, said plurality of heat energy transfer elements each having an elongate shape and heatable to a sufficiently high temperature to initiate melting of said phase change material from its solid phase to its liquid phase so that the phase change material is melted from the bottom as it moves to the lower portion of said container to cause newly-formed liquid phase change material to be displaced to the upper portion of said container.

17. The heat exchanger of claim 16 wherein said plurality of heat energy transfer elements comprise electrical resistance heated members circuited with an electrical power source.

18. The heat exchanger of claim 16 wherein said plurality of heat energy transfer elements are aligned with a length of said container and are arranged in a parabolic pattern within a plane through said container perpendicular to said length of said container.

* * * * *